United States Patent Office 3,179,704
Patented Apr. 20, 1965

3,179,704
PROCESS FOR THE RECOVERY OF PENTAERYTH-
RITOL FROM CRUDE MOTHER LIQUORS
Jackson D. Leonard, 437 5th Ave., New York, N.Y.
No Drawing. Filed Aug. 30, 1960, Ser. No. 52,760
3 Claims. (Cl. 260—637)

The invention relates to the recovery of pentaerythritol from crude mother liquors, also known as waste liquors, obtained as by-products in the manufacture of pentaerythritol and, more particularly, to a process wherein the pentaerythritol is extracted from these liquors with dimethylformamide in a yield not hitherto attained.

Pentaerythritol is conventionally produced by the condensation of acetaldehyde with formaldehyde in an aqueous medium containing a condensation catalyst. Alkali metal and alkaline earth metal compounds which are alkaline-reacting in aqueous solution are normally used as condensation catalysts. Thus, the oxides, hydroxides, carbonates, etc., are used. Sodium hydroxide and calcium hydroxide are particularly favored commercially as condensation catalysts for this manufacture. The main reactions taking place in a system of this type are believed to be the following:

$$3HCHO + CH_3CHO \rightarrow (HOCH_2)_3CCHO$$
$$(HOCH_2)_3 \cdot CCHO + HCHO + NaOH$$
$$\rightarrow (HOCH_2)_4C + NaCOOH$$

Regardless of the theory of reaction, a metal formate corresponding to the metal ion of the condensation catalyst is always found in considerable quantity in the reaction mixture. At the end of the condensation period, technical pentaerythritol is usually recovered from the reaction mixture by fractional crystallization. Several successive crops of pentaerythritol crystals can be removed from the reaction mixture in this manner. Ultimately, however, there results from the fractional crystallization a mother liquor or waste liquor, usually brown in color, from which it is not practical to attempt further recovery of pentaerythritol by fractional crystallization, due largely to the difficulty of inducing crystallization in such waste liquor and the excessive contamination of any products so obtained with metal formates, syrups, etc.

Referring again to the matter of the reactions involved in the manufacture of pentaerythritol, while the aforementioned equations represent the main reactions taking place, it has long been recognized that there are other reactions of significance taking place. Thus, it is known that along with the pentaerythritol monomer formed, there are formed comparatively small amounts of related hydroxylated substances. One of these compounds, dipentaerythritol, is an ether having the following structure:

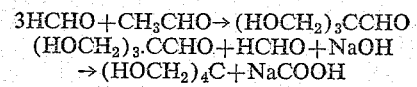

Another related compound, tripentaerythritol, is formed in even smaller amounts. According to the best evidence, it is believed to have the following structural formula:

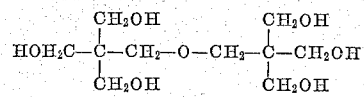

Dipentaerythritol, tripentaerythritol and higher ethers of pentaerythritol may be grouped together under the generic term "polypentaerythritols." In addition to the crystalline pentaerythritol and polypentaerythritols formed in the condensation of acetaldehyde and formaldehyde, there is always formed a certain, and usually substantial amount of noncrystalline syrups. The structure of these syrups is rather controversial. However, there is no doubt but what the presence of these syrups seriously interferes with the resolution of pentaerythritol reaction mixtures into their components.

From what has been said above, it will be apparent that the waste liquors resulting from the manufacture of pentaerythritol and with which this invention is concerned are liquors which have a rather complex array of components: pentaerythritol, polypentaerythritols, noncrystalline syrups, metal formates, etc. Due to the fact that the content of polypentaerythritols of such waste liquors is very small, their presence can for practical purposes be overlooked. It will be recognized, too, that the proportions of inorganic compounds, i.e., metal formates, to organic compounds (pentaerythritol plus syrupy products) contained in such waste liquors are rather high as compared with the proportions which obtain in the pentaerythritol reaction mixture prior to primary recovery. Similarly, these waste liquors have comparatively high concentrations of noncrystalline syrups.

Several prior art processes have been developed for the recovery of products from pentaerythritol waste liquor. Thus, it has been proposed to fractionally crystallize such waste liquor. Such a process is disadvantageous, however, for the reasons above-mentioned. It has also been proposed to concentrate the pentaerythritol waste liquor to a relatively high solids content and thereafter extract the same with a solvent such as ethanol, etc., in which the pentaerythritol is soluble. Pentaerythritol is then recovered from the alcohol solution by fractional crystallization. This process, however, is likewise disadvantageous in that the pentaerythritol so obtained is contaminated with a relatively large amount of metal formates and hence is entirely unsuitable for many purposes such as the manufacture of high grade synthetic resins. In fact, the metal formate content of pentaerythritol obtained in this manner is usually so high that it is impractical to try to upgrade the product, for example, by treatment with a cation exchange to reduce the metal ion content.

Furthermore, U.S. Patent 2,533,737 proposes to use tertiary butyl alcohol, tertiary amyl alcohol or secondary butyl alcohol to dissolve the pentaerythritols, leaving the metal formate as an undissolved solid. However, these alcohols dissolve only up to approximately 6 parts pentaerythritol per 100 parts solvent and, in addition, also dissolve and carry about approximately 2-4 percent metal formate, calculated on the pentaerythritol recovered.

I now have discovered a process for the extraction of pentaerythritol from the waste liquors obtained in the manufacture of pentaerythritol, which yields a pentaerythritol which practically is free from metal formates, in contrast to the processes disclosed in the prior art.

This process for the resolution of mother liquor or waste liquor obtained in the manufacture of pentaerythritol and obtaining pentaerythritol, organic syrups, metal formate and water comprises evaporating said waste liquor to substantial dryness, commingling the resulting dried waste liquor with dimethylformamide (DMF), said solvent being employed in an amount not substantially in excess of that required to dissolve all of the pentaerythritol and organic syrups contained in the dried waste liquor at the temperature employed, separating the resulting solution containing dissolved pentaerythritol and organic syrups from the undissolved material comprising metal formate, and recovering from the solution the pentaerythritol and organic syrups in a form substantially free of metal formate.

If desired, the solution of organic matter, i.e., pentaerythritol and organic syrups, can be evaporated to dryness to obtain a pentaerythritol-organic syrup mixture. For some purposes such a mixture is satisfactory and there is no need for resolving this mixture. On the other hand, it is possible to redissolve this material in water and fractionally crystallize the solution of organic matter to obtain a pentaerythritol fraction and an organic syrup fraction. If fractional crystallization is employed, the organic syrup remains in the mother liquor obtained in the last crystallization and it can be separated therefrom by evaporating off the water. It will be understood, of course, that the pentaerythritol first obtained as a result of such a fractional crystallization process is not pure pentaerythritol but has associated with it certain organic impurities. It is, however, substantially free of metal formate. If desired, it can be recrystallized one or more times to provide a product having the desired purity. Or, on the other hand, the aqueous solution of pentaerythritols can be treated with activated carbon to decolorize the solution, filtered, and the resulting clear solution of pentaerythritols returned to the main process stream for crystallization of the recovered pentaerythritol along with the virgin pentaerythritol in the main manufacturing process.

The organic syrup fraction obtained in accordance with the above-described fractional crystallization process is in all probability a very complex mixture. Like the pentaerythritol fraction, however, it is substantially free of metal formates. Since it is composed largely of polyhydric components, it can be used as a polyhydric alcohol in the manufacture of alkyd resins, etc.

As indicated above, the organic products obtained in accordance with this invention are characterized by being substantially free from metal formates. Thus, as will be evidenced by the specific examples to follow, pentaerythritol waste liquors containing sodium formate as the metal formate can be resolved to provide organic products having as low as 0.08% sodium formate. Reported recovery processes of the prior art utilizing the extraction principle provide products having 2–20% or more sodium formate. It will readily be seen that the products of the invention are of greater utility in the various commercial arts in which pentaerythritol is normally employed as compared with products obtained from prior art recovery processes. This improved utility results from the fact that the presence of large amounts of metal formates in pentaerythritol leads to pentaerythritol derivatives of low quality. The process according to the invention also provides pentaerythritol or related organic products having a sufficiently low metal formate content to make the further reduction of the remaining metal ion content unnecessary, as the 0.08% content is well below the limits of metal ions for practically all commercial applications. In this manner, pentaerythritol can be obtained from pentaerythritol waste liquors which has as low a metal content as pentaerythritol obtained by primary recovery from a pentaerythritol reaction mixture and which can equivalently be employed in the commercial arts.

By careful operation of the process of the subject invention it is also possible to obtain substantially pure metal formate as one of the products. Thus, in the case of pentaerythritol waste liquors containing sodium formate, sodium formate of 98–100% purity is obtainable.

The invention now will be further explained by the following example. However, it should be understood that this is given merely by way of illustration, not of limitation, and that numerous changes may be made in the details without departing from the spirit and the scope of the invention as hereinafter claimed.

All parts are by weight unless otherwise indicated. The "spray dried pentaerythritol waste liquor" to which reference is made in the ensuing example was obtained by spray drying the waste liquor resultant from condensing acetaldehyde with formaldehyde in the presence of lime as a condensation agent, precipitating the calcium cation by addition of $Na_2CO_3$, or the liquor resulting from the initial use of NaOH as the condensing agent, and fractionally crystallizing pentaerythritol from the resulting mixture. The waste liquor so obtained was one containing pentaerythritol, organic syrups and sodium formate. The spray dried waste liquor was a light brown powder containing 3% moisture.

*Example*

Spray dried pentaerythritol waste liquor was extracted with dimethylformamide. To effect the extractions, a glass extraction apparatus was fitted with a stirrer and suspended in a water bath maintained at a temperature of 95° C. Four parts spray dried pentaerythritol waste liquor and 10 parts solvent were charged into the extraction vessel and the contents were agitated at a temperature of 95° C. for 15 minutes. At the termination of the 15 minute extraction period, the suspension was filtered hot by gravity into a tared weighing bottle. After the weight of the filtrate had been determined, the filtrate was evaporated to dryness and the residue weighed. From the respective weight of filtrate and residue, the solubility (parts of solute per 100 parts of solvent) of the spray dried pentaerythritol waste liquor in the solvent was calculated. The sodium formate content of the extracted solids was determined by ashing the solids in the presence of sulfuric acid and determining the sodium sulfate resulting. The results of the extraction showed that 20 parts solids were extracted per 100 parts dimethylformamide solvent used, and when the solvent was evaporated from this extracted solid, and the hydroxyl value determined, it was found to contain 41.0% hydroxyl, and only 0.08% sodium formate, as determined by the sulfate ash method.

The residue remaining from the above extraction was washed on a filter with a small amount of fresh dimethylformamide solvent, then the solvent was evaporated, and the sodium formate content determined by the sulfate ash method. This residue was found to contain 99.2% sodium formate thus indicating that the use of dimethylformamide as a solvent for the extraction of pentaerythritol from mother, or waste, liquors resulting from the present commercial methods for producing pentaerythritol yields pentaerythritol substantially free of sodium formate, and sodium formate substantially free of pentaerythritol, in accordance with the process of this invention.

The concentration of the pentaerythritol waste liquor may be accomplished by evaporation or by other methods known to the art. It is, however, necessary to concentrate the pentaerythritol waste liquor to the point of substantial dryness. It is preferred that the pentaerythritol waste liquor as it comes from the pentaerythritol process be concentrated to a point where it contains no more than 5.0% water or moisture. It is still further preferred that the pentaerythritol waste liquor be concentrated to a point where it contains 1.25% or less moisture.

This is important as the sodium formate is highly soluble in water so that a sharp separation between the pentaerythritols and the sodium formate cannot be made if more than 5% water is present. Likewise, the dimethylformamide evaporated from the extracted pentaerythritols should be condensed, and then passed through molecular sieves or through a distillation column to remove water that may have been admitted with the pentaerythritol, before the solvent is re-used.

It is, of course, particularly important in the concentration of the pentaerythritol waste liquor that conditions effecting decomposition of the constituents thereof are not employed. It has been found that one form of concentration or drying the pentaerythritol waste liquor which is particularly effective for use in connection with this invention is that of spray drying. This is a process in which a solution is sprayed into a chamber through which a stream of hot gas is flowing. The solution is evaporated by the hot gas and the solution solids are collected in the chamber as a finely divided material. Another process which is particularly useful in this connection is that of drum drying. In this process, the solution is fed onto one or between two rotating heated drums in such a manner that it coats the drums and is evaporated thereon. A doctor knife scrapes off the resulting dry solids at a convenient point.

The amount of solvent to employ for present purposes can be widely varied. It will be evident, however, that since the metal formates are to some extent soluble in the solvent employed, it should be employed in an amount not substantially in excess of that which is required to dissolve all of the organic matter, i.e., the pentaerythritol and organic syrups, contained in the dried waste liquor at the temperature employed. As a practical matter it has been found that from 5 to 8 parts by weight of the DMF per part of the dried pentaerythritol waste liquor is very effective and is considered the preferred range for operations involving a single extraction. Such proportions apply for operations at a temperature within the range of from 80° C. to the reflux temperature of the mixture.

The temperature of extraction may be widely varied and any temperature up to the reflux temperature of the DMF-pentaerythritol waste liquor mixture may be used. Temperatures within the range of from 50° C. to the reflux temperature of the mixture are preferred due to the fact that at such elevated temperatures the solubility of organic matter in the solvent is increased. Such increased solubility decreases the amount of solvent required for substantially complete extraction of organic matter and makes for shorter extraction periods. It will be realized from what has been said that the temperature of extraction, period of extraction and proportions of solvent to dried waste liquor are interrelated factors which must be properly balanced in any practical embodiment of this invention.

Pentaerythritol is obtained from the DMF extracts resultant from the extraction step by fractional crystallization. The residual mother liquor resulting from such fractional crystallization contains the organic syrups in DMF solution. Upon evaporation of the DMF, the syrups remain as oily liquids, often dark in color. In preference to making such a separation, the entire DMF extract can be evaporated to remove the DMF and to provide a mixture comprising the pentaerythritol and the organic syrups.

Alternatively, the DMF extract from the extraction step which contains the pentaerythritol and syrups, may be processed by first evaporating the DMF for re-use, then dissolving the residue in water, adding enough activated carbon to decolorize the solution, filtering, and returning the resulting clear solution of pentaerythritol to the main process stream for recovery with the virgin pentaerythritol, or simply by fractional crystallization from the water solution itself.

The organic products obtained in accordance with this invention, i.e., pentaerythritol, organic syrups or mixtures thereof are characterized by being practically free from metal formates. For this reason, the products obtained by virtue of this invention are of greater utility in the various commercial arts in which pentaerythritol is normally employed as compared with similar products obtained from prior art waste liquor recovery processes. The presence of large amounts of metal formates in pentaerythritol leads to pentaerythritol derivatives of low quality. The process according to the invention provides pentaerythritol and related products having a sufficiently low metal formate content to be useful as such in certain commercial applications, as for example in the manufacture of alkyd resins, etc.

In this manner, pentaerythritol can be obtained from pentaerythritol waste liquor which has as low a metal content as pentaerythritol obtained by primary recovery from a pentaerythritol reaction mixture. An added advantage of the subject process is that it provides a metal formate of high purity.

I claim as my invention:

1. A process for the resolution of waste liquor obtained in the manufacture of pentaerythritol and containing pentaerythritol, organic syrups, substances selected from the group consisting of alkali formate and alkaline earth formate and water which comprises evaporating said waste liquid to substantial dryness, commingling the resulting dried waste liquor with anhydrous dimethyl formamide in an amount not substantially in excess of that required to dissolve all of the pentaerythritol and organic syrups contained in the dried waste liquor at the temperature employed, said commingling to be effected at a temperature between 50° C. and the reflux temperature, separating the resulting solution containing dissolved pentaerythritol and organic syrups from the undissolved material consisting essentially of said formate and recovering from the solution the pentaerythritol and organic syrups in a form substantially free of said formate.

2. A process for the resolution of waste liquor obtained in the manufacture of pentaerythritol and containing pentaerythritol, organic syrups, substances selected from the group consisting of alkali formate and alkaline earth formate and water which comprises evaporating said waste liquor to substantial dryness, commingling the resulting dried waste liquor with anhydrous dimethylformamide in an amount of substantially 10 parts per 4 parts dried waste liquor at the temperature employed, separating the resulting solution containing dissolved pentaerythritol and organic syrups from the undissolved material consisting essentially of said formate, recovering pentaerythritol from the solution and recovering the organic syrups by evaporating off the solvent from the residual liquor.

3. A process for the resolution of mother liquor resulting from the manufacture of pentaerythritol, such liquor containing pentaerythritol, organic syrups, substances selected from the group consisting of alkali formate and alkaline earth formate, and water, which comprises evaporating said mother liquor to substantial dryness, commingling the resulting dried mother liquor solids with substantially 10 parts dimethylformamide solvent per 4 parts dried liquor solids at the temperature employed, said commingling being effected at a temperature between 50° C. and the reflux temperature, separating the resulting solution containing dissolved pentaerythritol and organic syrups from the undissolved material consisting essentially of said formate, recovering pentaerythritol from the solution by evaporating the dimethylformamide solvent, dissolving the residue in water, decolorizing with activated carbon, filtering, and then recovering pentaerythritol from this water solution.

References Cited by the Examiner

UNITED STATES PATENTS 2,299,048 10/42 Wyler et al. _____ 260—637
2,533,737 12/50 Mertz _____ 260—637

OTHER REFERENCES

"DMF Product Information," Grasselli Chemicals Dept., E. I. du Pont de Nemours and Co. (April 1, 1954), Wilmington, Delaware; pages 4 and 16 relied on.

LEON ZITVER, *Primary Examiner.*

CHARLES B. PARKER, *Examiner.*